US008877119B2

(12) United States Patent
Jordan et al.

(10) Patent No.: US 8,877,119 B2
(45) Date of Patent: Nov. 4, 2014

(54) METHOD OF SYNTHESIZING MULTI-PHASE OXIDE CERAMICS WITH SMALL PHASE DOMAIN SIZES

(75) Inventors: Eric H. Jordan, Storrs, CT (US); Steven L. Suib, Storrs, CT (US); Aparna Iyer, Storrs, CT (US); Jacquelynn Garofano, Milford, CT (US); Chun-Hu Chen, Pingtung (TW)

(73) Assignee: University of Connecticut Center for Science and Technology and Commercialization, Farmington, CT (US)

( * ) Notice: Subject to any disclaimer, the term of this patent is extended or adjusted under 35 U.S.C. 154(b) by 196 days.

(21) Appl. No.: 13/328,492

(22) Filed: Dec. 16, 2011

(65) Prior Publication Data

US 2012/0322645 A1    Dec. 20, 2012

Related U.S. Application Data

(60) Provisional application No. 61/459,751, filed on Dec. 17, 2010.

(51) Int. Cl.
*B28B 1/00* (2006.01)
*B28B 3/00* (2006.01)
(Continued)

(52) U.S. Cl.
CPC .......... *C01B 13/185* (2013.01); *C01F 5/06* (2013.01); *C01F 17/0043* (2013.01); *C04B 2235/9653* (2013.01); *C04B 2235/3225* (2013.01); *C01P 2002/72* (2013.01); *B82Y 30/00* (2013.01); *C04B 35/505* (2013.01); *C04B 35/6267* (2013.01); *C04B 2235/3206* (2013.01); *B82Y 40/00* (2013.01); *C01P 2004/64* (2013.01); *C04B 35/624* (2013.01); *C01F 7/162* (2013.01);
(Continued)

(58) Field of Classification Search
USPC ............. 264/621, 622, 623; 423/338; 65/395, 65/440, 17.2; 501/152
See application file for complete search history.

(56) References Cited

U.S. PATENT DOCUMENTS 5,352,642 A * 10/1994 Pak et al. ...................... 501/95.1
6,482,387 B1 * 11/2002 Gulgun et al. .............. 423/593.1

(Continued)

OTHER PUBLICATIONS

Veith et al. Low temperature synthesis of nanocrystalline Y3Al5O12 (YAG) and Ce-doped Y3Al5O12 via different sol-gel methods. J Mater Chem 1999, 9, 3069-3079.*

(Continued)

*Primary Examiner* — Noah Wiese
(74) *Attorney, Agent, or Firm* — Ohlandt, Greeley, Ruggiero & Perle, L.L.P.

(57) ABSTRACT

Nanocomposites of multi-phase metal oxide ceramics have been produced from water soluble salts of the resulting metal oxides by a foaming esterification sol-gel method. The evolution of volatile gases at elevated temperature during the esterification reaction causes the formation of a foam product. Nanocomposites of multi-phase metal oxide ceramics have also been produced by a cation polymer precursor method. In this second method, the metal cations are chelated by the polymer and the resulting product is gelled and foamed. Calcination of the resulting foams gives nanocomposite powders with extremely fine, uniform grains and phase domains. These microstructures are remarkably stable both under post-calcination heat treatment and during consolidation by hot-pressing.

2 Claims, 5 Drawing Sheets

(51) Int. Cl.

| | | |
|---|---|---|
| C04B 33/32 | (2006.01) | |
| C04B 33/36 | (2006.01) | |
| C01B 33/12 | (2006.01) | |
| C01F 5/06 | (2006.01) | |
| C01F 17/00 | (2006.01) | |
| B82Y 30/00 | (2011.01) | |
| C04B 35/505 | (2006.01) | |
| C04B 35/626 | (2006.01) | |
| B82Y 40/00 | (2011.01) | |
| C01B 13/18 | (2006.01) | |
| C04B 35/624 | (2006.01) | |
| C01F 7/16 | (2006.01) | |
| C04B 35/053 | (2006.01) | |
| C04B 35/645 | (2006.01) | |
| C04B 35/632 | (2006.01) | |
| C04B 35/636 | (2006.01) | |

(52) U.S. Cl.
CPC .......... *C04B 2235/80* (2013.01); *C04B 35/053* (2013.01); *C04B 35/62675* (2013.01); *C04B 35/645* (2013.01); *C04B 2235/3244* (2013.01); *C04B 2235/447* (2013.01); *C04B 35/632* (2013.01); *C04B 35/636* (2013.01); *C01P 2004/04* (2013.01); *C01B 13/18* (2013.01)
USPC .......................... 264/621; 264/623; 423/338

(56) References Cited

U.S. PATENT DOCUMENTS 7,148,480 B2   12/2006   Zhan et al.
7,968,609 B2    6/2011   Suciu

OTHER PUBLICATIONS

Wang et al. Synthesis of Nanosize Powders and Thin Films of Yb-doped YAG by Sol-Gel Methods. Chem Mater. vol. 15, No. 18, 2003. 3474-3480.*

* cited by examiner

METHOD OF SYNTHESIZING MULTI-PHASE OXIDE CERAMICS WITH SMALL PHASE DOMAIN SIZES

CROSS-REFERENCED APPLICATION

This application claims priority to U.S. Provisional Application No. 61/459,751, filed on Dec. 17, 2010, which is incorporated herein by reference in its entirety.

BACKGROUND OF THE DISCLOSURE

1. Field of Disclosure

The present disclosure relates to new methods for making multi-phase nanocomposite materials and, more specifically, to nanocomposite ceramics from inexpensive starting materials and reagents. These multi-phase oxide ceramics powders are produced with very small (typically less than 100 nanometers) nano phase domains. Such materials have superior resistance to grain growth upon heating and are more readily processed into very fine structured multi-phase ceramics with superior mechanical, catalytic and optical properties.

2. Background of the Disclosure

There are two main reasons for the recent interest in nanocomposite ceramics. Firstly, these materials can exhibit enhanced properties as compared with the corresponding coarse-grained ceramic composites or with single-phase nanostructured ceramics. The range of properties that can be influenced by the structure of nanocomposite ceramics include the mechanical, chemical, thermal, electrical, magnetic and optical properties. Secondly, nanocomposite ceramics can exhibit greatly enhanced microstructure stability as compared with single-phase nanostructured ceramics. This can be important for materials that will experience high temperatures during processing and/or service. This microstructure stability arises due to grain-boundary pinning and/or lower coarsening rates for phase domains than for grains within a domain. Both of these effects are enhanced in nanocomposites with fine, uniformly dispersed phase domains. The production of nanocomposite ceramics with fine uniform phase domains is particularly challenging due to the need to control both the microstructure length scales and the elemental distributions. Many of the conventional synthetic methods for producing ceramics (e.g. precipitation, hydrothermal, reflux, thermal decomposition, etc.) are not amenable to such control because of the reaction/nucleation rates involved and/or the physical/chemical properties of the components. Although various different approaches have been developed to overcome these limitations, these typically involve complex equipment, extremely high temperatures and/or low yields, resulting in high production cost.

Sol-gel methods utilize lower temperatures and offer a greater degree of control over elemental ratios and homogeneity than most of the methods mentioned above. A potential drawback is that effective sol-gel processing requires precise control of synthesis conditions and, usually, expensive organometallic precursors. Thus, sol-gel processed nanocomposite ceramics can also be expensive.

A less costly derivative of the sol-gel technique is esterification sol-gel (ESG) processing, which utilizes esterification of less expensive precursors to create a similar sol-gel environment under a wider range of synthesis conditions. This ESG approach has been used recently for the synthesis of catalytic nanoparticles and metal oxide/polymer nanocomposites (D T Jiang and A. K. Mukherjee, "Synthesis of $Y_2O_3$—MgO Nanopowder and Infrared Transmission of the Sintered Nanocomposite," *Proceedings of SPIE—Intl. Soc. for Optical Engr.*, 703007 I-A5 (2008)). There it is reported that the microstructure evolved with increasing heat treating temperature. Taking advantage of high heating rates, spark plasma sintering (SPS) technique was used to sinter the nanopowder, which was said to result in a fully dense nanocomposite with grain size below 100 nm.

SUMMARY OF THE DISCLOSURE

Disclosed herein are methods and compositions for producing engineered nanocomposites for optical applications. The disclosure comprises a new class of ceramic materials that have the necessary optical properties as well as excellent mechanical and physical properties.

In a first embodiment of the present disclosure, there is provided a method of making a multi-phase nanocomposite oxides. In this first method, an aqueous solution of a water-soluble organic acid and water-soluble organic alcohol, which will form an ester under appropriate conditions, is prepared. Next, a solution of a combination of more than one water-soluble metal salts (which do not form a combined phase (i.e. are substantially immiscible) when heated), to obtain an aqueous solution of the metal salts, is prepared. The two solutions are combined and heated to a temperature and for a time sufficient to produce a foam comprised of (i) the ester of the acid and alcohol and (ii) the metal salts. The mixture of solutions and the resulting foam help to ensure that the metal salts are substantially homogenously distributed. The foam is then further heated to eliminate organic matter and thereafter treated, such as by milling or other method, to obtain a powder. The resulting powder is heated at a temperature and for a time sufficient to obtain a calcined powder comprised of metal oxides of the metal salts. The calcined powder may then be advantageously heated in a post-calcination heat treatment at a temperature and for a time sufficient to obtain a multi-phase nanocomposite comprised of the metal oxides.

In a second embodiment of the present disclosure, there is provided an alternative method for making a multi-phase nanocomposite. In this second method, metal cations are chelated by mono- and/or disaccharide molecules and are substantially homogenously distributed in a liquid phase. At a gelation step at elevated temperature (typically in the range of ~200° C.), the cations are prevented from moving freely in the gel, thus preventing particle aggregation and/or precipitation. This step forms a brown colored mushroom like foam called the "precursor" foam. During a subsequent calcination step of the precursor foam, the mono- and/or disaccharide is hydrolyzed in the presence of an acid to break down the mono- and/or disaccharide into simpler chemical components (e.g. glucose and fructose). These simpler molecules are further oxidized to gluconic acid. The —COOH groups and —OH groups in the polyhydroxy acid complex with metal cations during the calcination process forming a polymeric network. The organic-cation network is destroyed by the end of calcination leaving behind a highly porous structure of nano-sized composites with a substantially homogenous distribution.

The general class of chemistry used in the disclosed methods is well known. What is not well known is that the phase domains produced by this method are on a nano-scale. The determination of the phase domain size requires transmission electron microscopy (TEM). By this TEM-based evaluation the process can be optimized to produce the desired results.

DETAILED DESCRIPTION OF THE DISCLOSURE

The present disclosure will now be described by reference to an exemplary embodiment of the methods, including the sol-gel method and the cation polymer precursor method.

Figure 1:
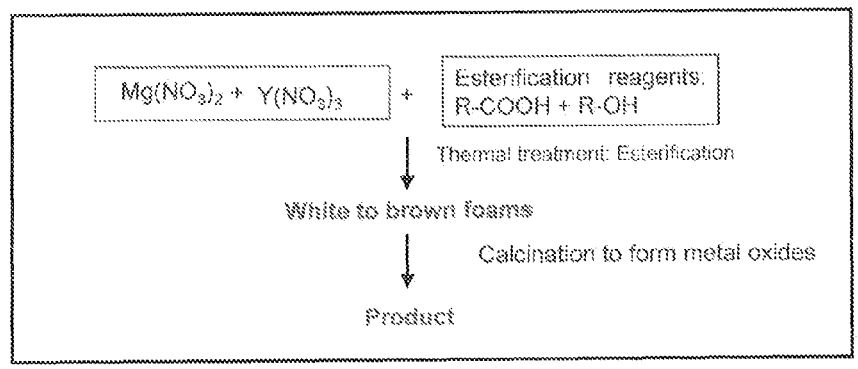
FIG. 1 shows the synthesis scheme in flow chart form of an exemplary embodiment of the present disclosure for production of nanocomposites by an esterification sol-gel method.
Figure 2:
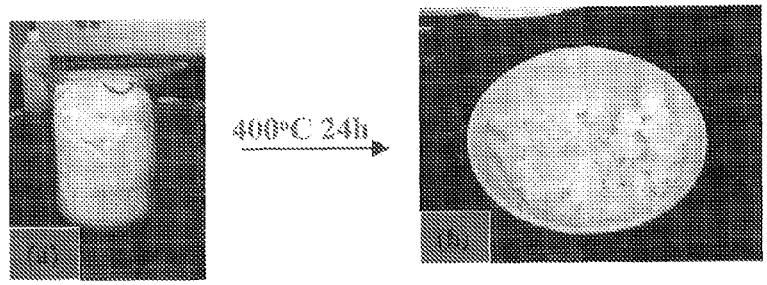
FIG. 2 shows images of (a) as-prepared esterification foam and of (b) the product after calcination.

In this first exemplary embodiment, the esterification sol-gel method utilizes two organic complexing chemicals (e.g., citric acid (CA, R—COOH) and ethylene glycol (EG, R—OH)) to perform an aqueous esterification reaction, leading to formation of polymerized organic foam. R can be any organic chain or backbone. Combinations of useful acids and alcohols can be found in the literature and their suitability can be determined with minimal experimentation. Many combinations of organic complexing chemicals may be utilized, as long as the use leads to esterification at the desired temperature and time for any particular application. In a typical synthesis, following the general sequence of the reaction shown in FIG. 1, an aqueous solution of mixed citric acid and ethylene glycol is prepared. MgO and $Y_2O_3$ precursors (e.g. $Mg(NO_3)_2$ and $Y(NO_3)_3$) are then mixed with the desired ratios (Mg/Y=0-1) to obtain a clear aqueous solution. The oxide precursors need not be limited to the nitrate form. As long as the oxide precursor (i.e., metal salt) provides the desired cation and is sufficiently soluble in aqueous solution for the desired purposes, then that metal salt may be used. The aqueous solutions were then combined and stirred, and then placed in an oven and cured until foam (FIG. 2 (a)) is produced. The organic foam thus obtained, having the oxide precursors dispersed substantially homogeneously therein, is believed to act as a template to control the phase domains and chemical homogeneity of the resulting $MgO/Y_2O_3$ nanocomposites. After calcination, the organic template material is removed to generate $MgO/Y_2O_3$ nanocomposites (FIG. 2b).

In more detail, magnesia-yttria ($MgO$-$Y_2O3$) composites were prepared via an ESG route using the following reagents: magnesium nitrate ($Mg(NO_3)_2 \cdot 6H_2O$), yttrium nitrate ($Y(NO_3) \cdot 6H_2O$), citric acid and 99.0% ethylene glycol. Several different composite compositions were produced from these reagents, but for brevity here only data from the reagent mixture that resulted in composites with approximately 90 mol % MgO will be presented. Two aqueous solutions of 0.5M $Y(NO_3)$ and 0.5M $Mg(NO_3)_2$ were prepared first using distilled deionized (DDI) water. In a typical synthesis, 7.68 g of citric acid (40 mmol) was dissolved in 80 ml of DDI water in a 600 ml beaker and then 0.826 g of ethylene glycol (13 mmol) was added yielding a clear and colorless solution. After stir aging for 5 minutes, 14 ml of 0.5M $Y(NO_3)$ (7 mmol) and 66 ml of 0.5M $Mg(NO_3)_2$ (33 mmol) were added sequentially into the clear organic solution. After another 10 min of stirring, the beaker containing the solution was placed into an oven pre-heated to 200° C. This stage of the process promotes the esterification reaction since decomposition of citric acid occurs at ~170° C. Upon removal from the oven after 3 hours, the beaker was filled completely with highly porous pale-brown foam (FIG. 2a). The form of this product is consistent with the generation of nitrous oxides ($NO_x$) during the esterification reaction between citric acid and glycol, resulting in the porous organic foam. The brown color of the foam indicates that there are carbonaceous species in the material, presumably due to the onset of decomposition in the polymerized network. The presence of carbonaceous species was confirmed in separate Fourier transform-infrared (FTIR) spectroscopy experiments (results not shown).

The material was then calcined at 400° C. for 24 hours in a muffle furnace to convert the Mg- and Y-containing organic foam to the oxide composite. This calcination results in significant volume shrinkage and a change in color to nearly pure white (FIG. 2b), indicating the removal of the carbonaceous species, as confirmed by FTIR spectroscopy (results not shown).

To evaluate the microstructural development/stability in the composite material, samples of the resulting white product were crushed to powder form and then subjected to post-calcination heat-treatment (PCHT) for 1 hour at 800° and 1100° C. Preliminary consolidation trials were performed by: pulverizing the calcined (400° C.) foam in a SPEX mill; introducing 6 g of the powder into a vacuum hot press; evacuating the chamber to a background pressure of 66 mPa; heating the chamber to 900° C. and allowing the powder to outgas for 30 minutes; applying an axial pressure of 20 MPa; heating gradually (over 90 min) to 1300° C. and maintaining the axial pressure for 30 minutes; and then unloading and cooling to ambient temperature under vacuum in the chamber. As a basis for comparison, an additional powder sample was prepared with a PCHT of 30 minutes at 1300° C. to mimic the final stage of the hot-pressing sequence. The samples obtained by vacuum hot pressing at 1300° C. and by subjecting the sample to a PCHT at 1300° C. for 30 minutes showed remarkably similar sizes and morphologies of the grains and phase domains.

Figure 3:
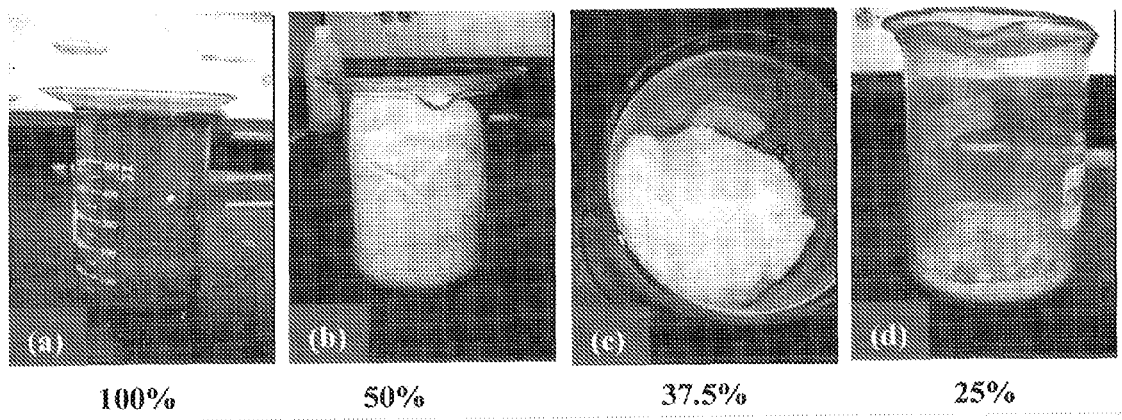
FIG. 3 shows images of foams with various organic concentrations obtained by the sol-gel method of FIG. 1, where the volume and color of the foam are controlled by the organic concentrations.

For the disclosed sol-gel method, the concentrations and ratios of the organic complexing materials, and the post-calcination conditions and programs are factors useful to control the domain sizes and chemical homogeneity of final products. As shown in FIG. 3, the volumes and colors of template foams vary with the organic concentrations, indicating that the material sizes and shapes may be controlled via the porosities and polymerization structures of the foams.

Figure 4:
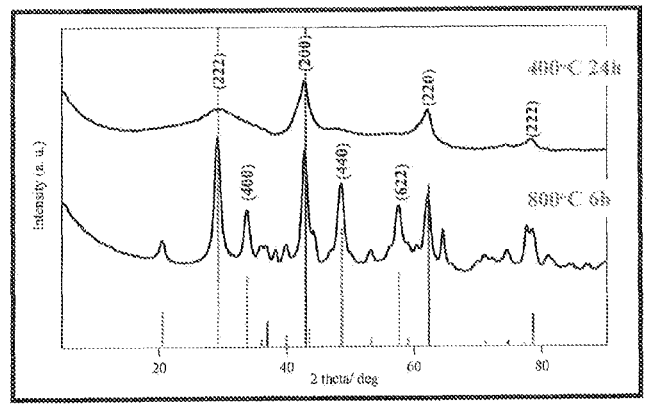
FIG. 4 shows the X-ray diffraction (XRD) pattern of products after different calcination programs.
Figure 5:
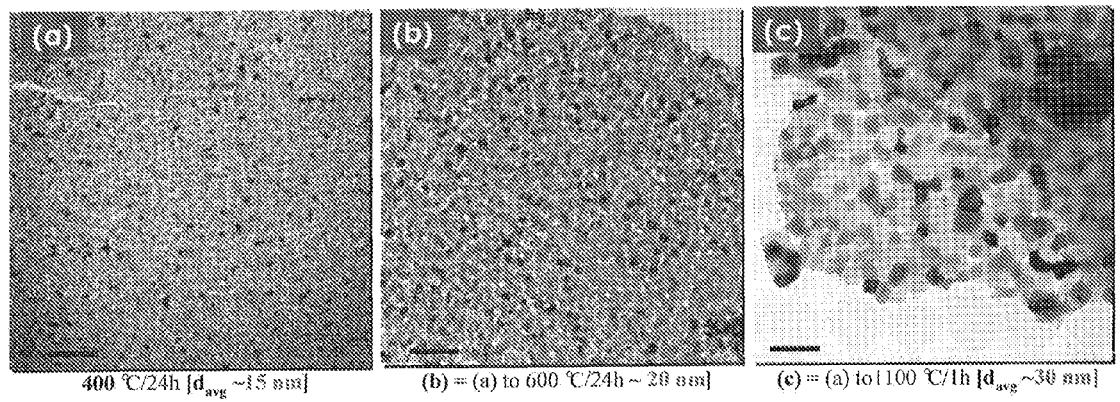
FIG. 5 shows the TEM images of products after different calcination programs.

The results of calcination are shown in FIG. 4 and FIG. 5. The XRD patterns (FIG. 4) show that higher temperature calcination produces better crystallinity of $MgO/Y_2O_3$ composites. FIG. 4 shows the XRD pattern of products after different calcination programs. The pattern calcined at 400° C. with broader peaks indicates that the material has smaller particle sizes/phase domains and poor crystallinity. After 800° C. calcination, the product has better crystallinity and smaller particle sizes (sharper peak). All these peaks correspond to cubic MgO (blue standard pattern) and $Y_2O_3$ (red standard pattern). The TEM study (FIG. 5) shows that the particle sizes are well controlled within 15-30 nm even under high temperature calcination programs. Specifically, the TEM images of products after different calcination programs are: (a) 400° C./24 h; (b) 600° C./24 hours on the sample obtained from (a); and (c) 1100° C./1 hours on the sample obtained from (a). The particle sizes are (a) ~15 nm, (b) ~20 nm, and (c) ~30 nm, respectively. Such high temperature calcination programs facilitate the elimination of trace amount of carbonate and hydroxide species very well. Elemental analyses show a highly homogeneous elemental distribution. The initial low-temperature calcination step is important to produce the intermediate amorphous/vitreous state and thus to establish this stable phase distribution. In separate trials (not shown) performed by heating the organic foam to 800° C. or 1100° C. directly without the initial calcination, the same MgO and Y2O3 phases were formed but the grain and phase domain sizes were larger and less uniform.

Figure 6:
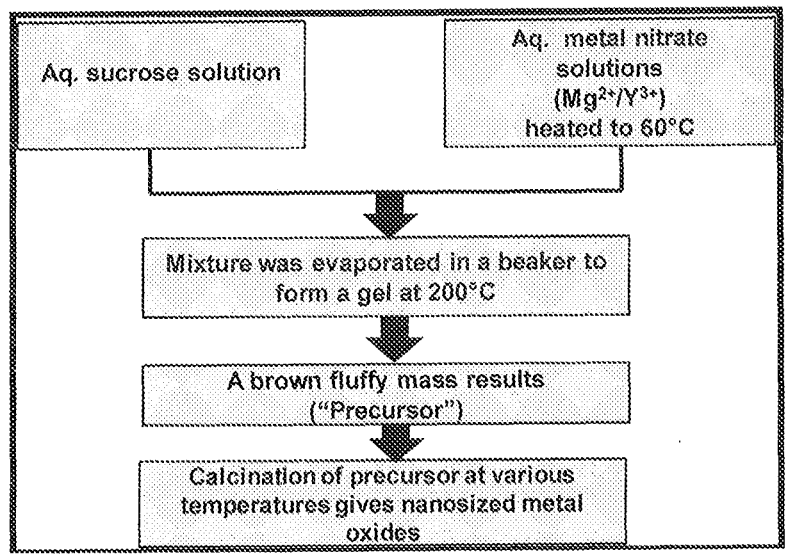
FIG. 6 shows the synthesis scheme in flow chart form of another embodiment of the present disclosure for production of nanocomposites by a cation polymer precursor method.
Figure 7:
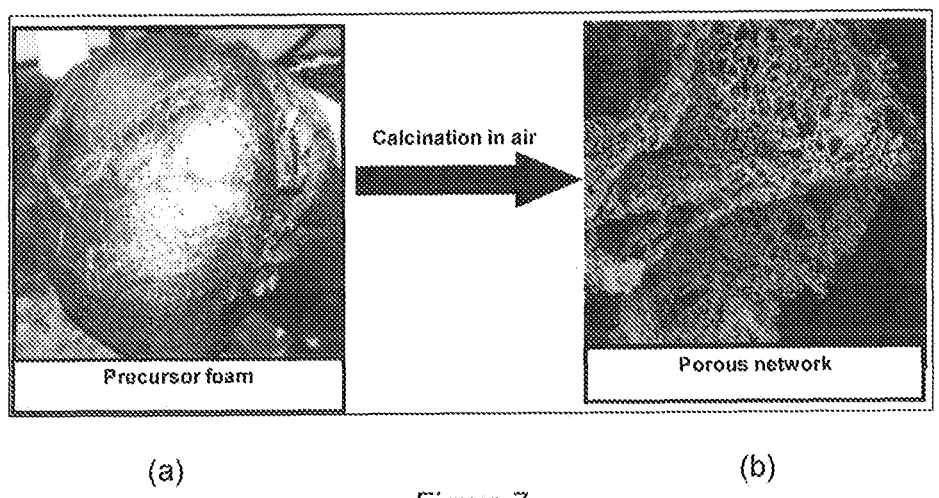
FIG. 7 shows an image of (a) the brown precursor foam before calcination and (b) scanning electron microscope (SEM) image of the porous metal oxide powder after calcination obtained by the cation polymer method precursor method of FIG. 6.
Figure 9:
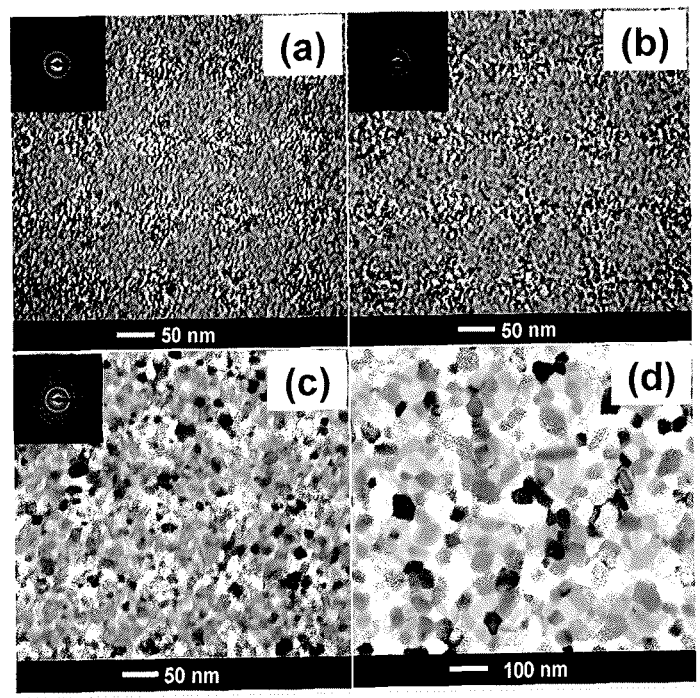
FIG. 9 shows representative TEM images with inset SADPs (selected area diffusion patterns) of products obtained at various stages of the present method.
Figure 10:
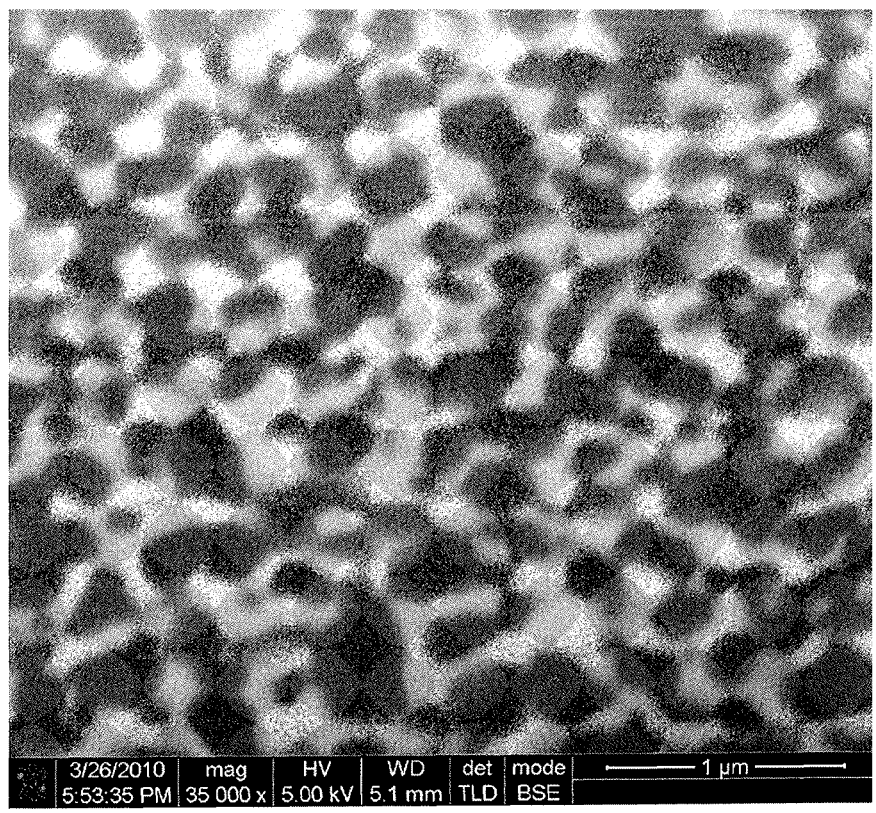
FIG. 10 shows Small phase domains of $MgO$—$Y_2O_2$ composite made from the ESG powder milled and vacuum hot pressed at 1300° C. for 30 minutes.

In the second preferred embodiment, nanocomposites of magnesium oxide-yttrium oxide were also prepared by a cation polymer precursor method using sucrose as a polymeric precursor reagent. The synthesis is briefly described schematically with respect to a preferred exemplary embodiment in FIG. 6. In this process, the metal cations are chelated by sucrose molecules and hence are substantially homogenously distributed in the liquid phase. At the gelation step, typically at about 200° C., the cations are prevented from moving freely in the gel and this helps to prevent particle aggregation and/or precipitation. Continued heating during this gelation step forms a brown colored mushroom-like foam, called the "precursor" foam (FIG. 7 (a)). During the calcination step of the precursor foam, sucrose is hydrolyzed in the presence of nitric acid to break down into glucose and fructose. These molecules further are oxidized to gluconic acid. The —COOH groups and —OH groups in the polyhydroxy acid form a complex with metal cations during the calcination process that form a polymeric network. The organic-cation network (i.e. the polymeric network) is destroyed at the end of calcinations, leaving behind a highly porous structure of nanometer-sized composites with homogenous distribution (FIG. 9).

Studies on several other metal oxides synthesized by the cation polymer precursor method (results not shown) have suggested that the presence of a polymer like PVA helps in forming a branched polymeric network and is believed to aid in the complexation of metal cations at the calcination stage. However, in this study, there was no difference found in particle sizes (as measured by TEM), with or without the presence of a polymer like PVA.

Magnesia-yttria (MgO—Y2O3) composites were prepared via the cation polymer precursor method using the following starting reagents: magnesium nitrate ($Mg(NO_3)_2 \cdot 6H_2O$), yttrium nitrate ($Y(NO_3)_3 \cdot 6H_2O$) and sucrose. In a typical synthesis procedure, $Mg(NO_3)_2 \cdot 6H_2O$ and $Y(NO_3)_3 \cdot 6H_2O$ are added to a beaker containing DDI water and kept at 60° C. or any other reasonable sub-boiling point temperature. After complete dissolution of the magnesium and yttrium nitrates in DDI, an aqueous solution of sucrose was added. While mole ratios from 4:5 and 1:80 may be used, it was found that a 1:4 metal:sucrose mole ratio is preferred. The sucrose solution is added to the metal precursor solution. The resultant mixture is acidified with an oxidizing acid to a pH in the range of 1-5. The preferred embodiment used 10% (v/v) $HNO_3$ to achieve an acidic pH of 2-5. The reaction mixture was then placed in an oven at a modest temperature in the range of 150° C.-260° C. for a selected period of time; in the preferred embodiment the temperature/time parameter used was 200° C. for 24 hours. This process created a mushroom-shaped brown porous foam referred to as the "precursor" foam (FIG. 7 (a)). Calcination in air yielded a porous network comprised of substantially homogeneously dispersed metal oxides with organic material remaining. Calcination of the precursor foam in a muffle furnace yielded white powders of MgO—$Y_2O_3$ nanocomposite oxide. Calcination and post calcination heat treatments were carried out at various temperatures to evaluate the structure, particle size and stability of the composite material.

Figure 8:
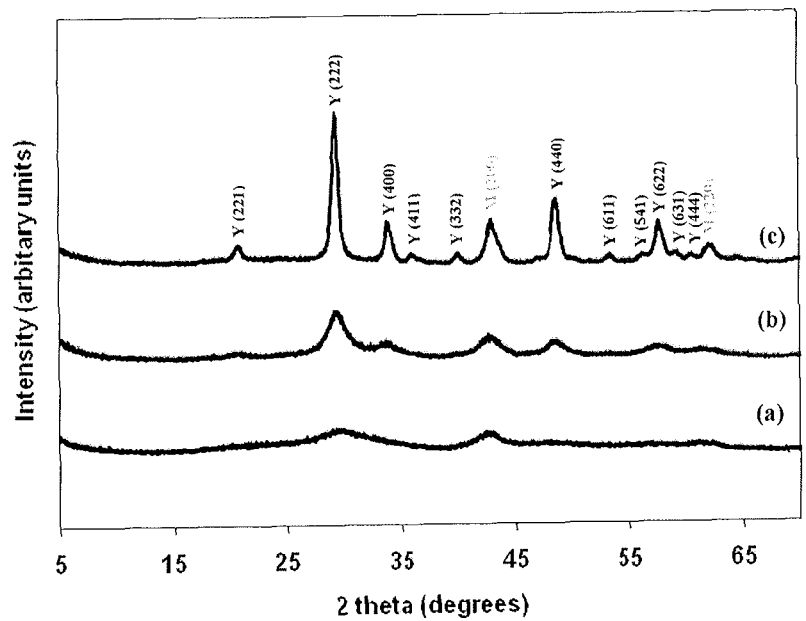
FIG. 8 shows XRD patterns of nanocomposites obtained by calcination of the precursor foam of FIG. 7 at various temperatures.

Following the above reaction step, the resulting materials can be heat treated over a very wide variety of schedules and multi-step schedules. Post synthesis heat treatment temperatures can range from about 260° C. to the melting temperature of the oxides. Studies showed that the calcination temperature of the precursor foam was an important factor affecting grain growth of MgO and $Y_2O_3$. XRD patterns (FIG. 8) show extremely broad peaks when the foam was calcined at 400° C., as opposed to sharper peaks attained upon calcination at 800° C., indicating increasing crystallinity. In FIG. 8, there are XRD patterns of MgO—$Y_2O_3$ nanocomposites obtained by calcination of the precursor foam at various temperatures: (a) calcined at 400° C. for 24 hours; (b) calcined at 600° C. for 2 hours; (c) calcined at 800° C. for 2 hours (M=peaks for cubic MgO (JCPDS: 04-829); Y=peaks for cubic $Y_2O_3$ (JCPDS: 41-1105)). Grain sizes were measured from TEM images of calcined samples. The results of calcination study are shown in FIG. 9. The TEM study (FIG. 9) shows that grain sizes are less than 10 nm when calcination was done at 400° C. to 600° C. At 800° C., the grain size increases to ~17 nm and with elevated calcination temperature of 1100° C.~55 nm sizes are obtained. The insets in FIG. 9 show that at 400° C. and 600° C. diffuse rings are present in the selected area diffraction patterns (SADPs) indicating that some amorphous materials remain in the powders. At 800° C., discontinuities appear in the SADP due to the increase in crystallinity. Brightness contrast from TEM (FIG. 9)) indicates that the grains of MgO (bright) and $Y_2O_3$ (dark) are substantially homogenously distributed.

Calcination heat treatment can be done at a wide range of temperatures and conditions depending on the desired end product. All such heat treatments can be started at about 260° C. and going to the materials' melting temperature. To remove residual carbon due to processing, heat treatment generally above 500° C. is used. In addition, it has been found that initial heat treatment below 500° C. leads to more uniform microstructures if the materials are further heat treated at a higher temperature as compared to results from direct higher temperature heat treatment without the preliminary heat treatment below 500° C. A preferred heat treatment is 1100° C. for 30 minutes.

Using the methods disclosed herein, nanocomposites of MgO with $Y_2O_3$ have been produced from the respective nitrates by an esterification sol-gel reaction with ethylene glycol and citric acid. The evolution of nitrous oxides during the initial heating step reaction causes the product to foam, and the calcination of this foam gives nanocomposite powders with extremely fine, uniform grains and phase domains. These microstructures are remarkably stable both under post-calcination heat treatment and during consolidation by hot-pressing. These stable microstructures arise as a result of the decomposition sequence which is believed to involve the formation of a metastable amorphous/vitreous intermediate followed by concurrent crystallization and phase separation on the nanoscale.

Also using the methods disclosed herein, nanocomposites of MgO with $Y_2O_3$ have been produced from the respective nitrates by a cation polymer precursor method using sucrose as the polymeric precursor. The sucrose chelates the cations and maintains the cations in substantially homogenous dispersion. Heating a mixed solution of metal oxide precursors and sucrose yields a gel which maintains the cations in a dispersed state. Further heating of the gel and subsequent calcination yield dispersed, uniform metal oxide nanocomposite powders. These nanocomposite powders can likewise be treated by post-calcination heat treatment and consolidation by hot-pressing, and the microstructures of the nanocomposite powders remain stable under such treatments.

The disclosed methods and conceptual approach for designing and synthesizing nanocomposite ceramics are applicable to a wide variety of nanocomposite ceramic systems. The disclosed methods provide low-cost production of such materials. These simple and inexpensive procedures can be used as is or with modification for the production of other oxide-oxide nanocomposites. In other embodiments of the disclosed technology, the methods disclosed herein are applied to use of oxide materials that have no secondary phase after this procedure. Such materials can be used and will result in composites with nanoscale phase domains. For example, there is no combined phase for $Y_2O_3$ and MgO, so this combination works in the disclosed method. In other words, the phases are substantially immiscible. In contrast, $AlO_x$ and MgO form a combined phase (spinel) at low temperature (<400-500° C.) and thus the grain size cannot be controlled as readily.

In yet further embodiments of the disclosed technology, combinations of oxides are selected from $CeO_x$ (cubic), ZnO, CaO, CuO, CrO, TiO, MnO and combinations thereof. Multi-component ceramics or composites prepared as disclosed herein will have small phase domain sizes, and the resulting materials will have the advantageous features described herein. In a still further embodiment, more than two components can be used. By way of example, YSZr was used with $Y_2O_3$ and MgO and the resulting composite has small phase domains as demonstrated by an EDX signal of Zr. In this example only a small amount of Zr (1% vol.) was used. Combinations of other oxides (starting with nitrate salts) were used, such as ZrO, $ZnO_x$, $CeO_x$, but these results are not shown here.

The methods and products disclosed herein also comprise multi-component composites of more than two metal oxide elements. The methods and products system may comprise three, four, or five element-containing ceramic composites with nanophase domains. The methods and products disclosed herein comprise any immiscible metal oxide phase combinations of two or more metal oxide elements, such that the resulting phases are maintained substantially distinct. As an example, metal nitrides can be used either alone or in combination with metal oxides.

While the disclosure has been described with reference to embodiments, it will be understood by those skilled in the art that various changes may be made and equivalents may be substituted for the elements thereof without departing from the scope of the disclosure. In addition, many modifications may be made to adapt the teaching of the disclosure to particular use, application, manufacturing conditions, use conditions, composition, medium, size, and/or materials without departing from the essential scope thereof. Therefore, it is intended that the disclosure not be limited to the particular embodiments and best modes contemplated for carrying out this disclosure as described herein. The accompanying claims are intended to cover such modifications as would fall within the true scope and spirit of the present disclosure. All of the patents and publications referenced herein are intended to be incorporated herein by reference for all of the information contained therein.

What is claimed is:

1. A method of making a multi-phase nanocomposite comprising:
   a. preparing an aqueous solution of citric acid and ethylene glycol;
   b. adding to the solution of step a. a combination of water-soluble salts of yttrium and magnesium to obtain an aqueous solution of citric acid, ethylene glycol and yttrium and magnesium salts;
   c. heating the solution of step b. at a temperature of about 200° C. for between about 2-4 hours to produce a foam comprised of (i) the ester of citric acid and ethylene glycol and (ii) the yttrium and magnesium salts;
   d. milling the foam to obtain a powder;
   e. heating the powder at a temperature between about 300° C.-500° C. for a time between about 12-36 hours to obtain a calcined powder comprised of metal oxides of the metal salts; and
   f. heating the calcined powder in a post-calcination heat treatment at a temperature between about 700° C.-1200° C. for a time between about 0.5-2.0 hours to obtain a multi-phase nanocomposite comprised of the metal oxides.

2. The method of claim 1, further comprising the step of consolidating the post calcined nanocomposite by vacuum hot pressing at a temperature of about 1300° C. for a time of about 0.5 hour.

* * * * *